(No Model.)
C. W. NICHOLSON.
FERTILIZER DISTRIBUTER.
No. 443,864. Patented Dec. 30, 1890.
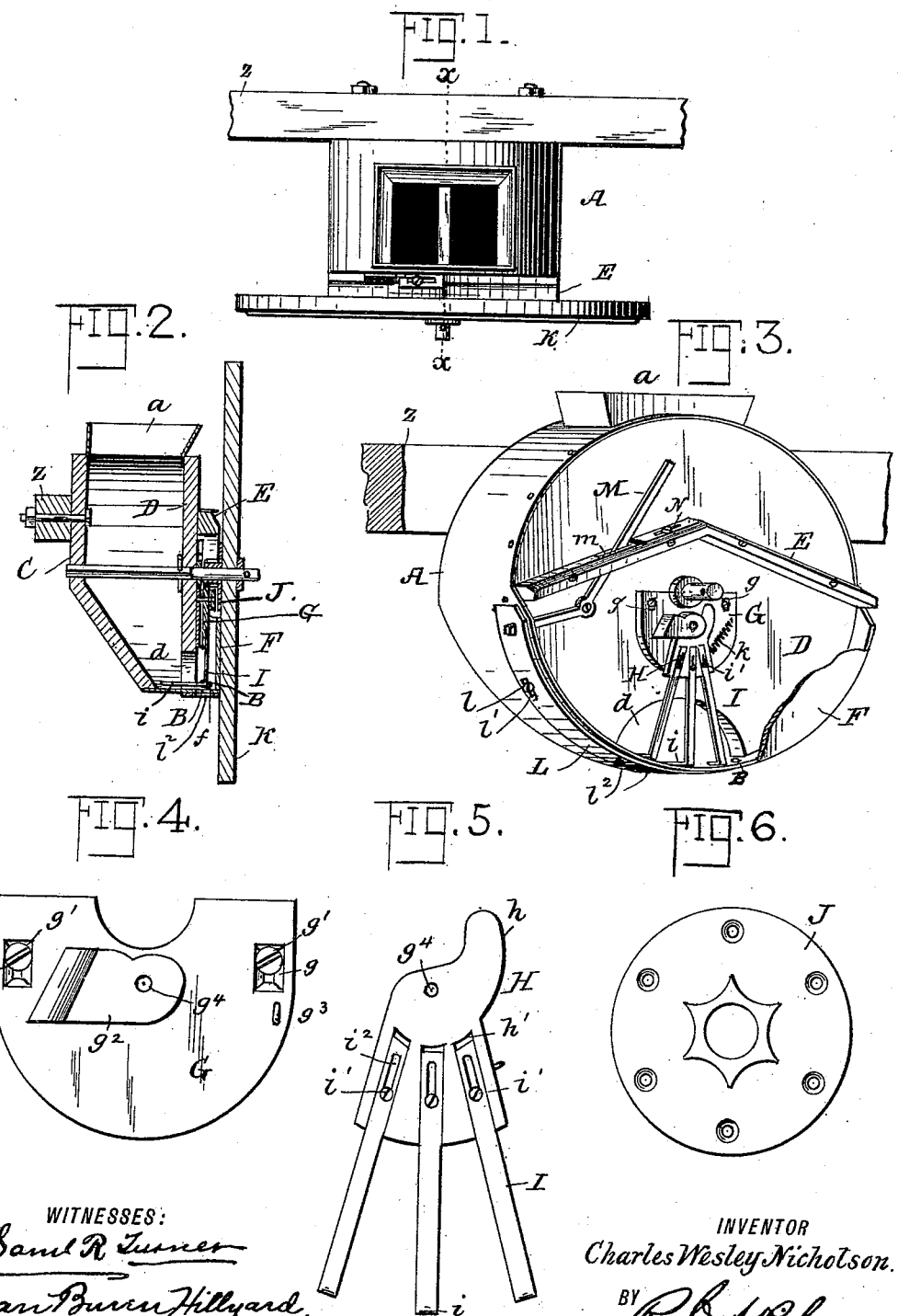
WITNESSES:
INVENTOR
Charles Wesley Nicholson.
BY
his ATTORNEYS.

UNITED STATES PATENT OFFICE.

CHARLES WESLEY NICHOLSON, OF ASSAMOOSICK, VIRGINIA.

FERTILIZER-DISTRIBUTER.

SPECIFICATION forming part of Letters Patent No. 443,864, dated December 30, 1890.

Application filed September 27, 1890. Serial No. 366,342. (No model.)

*To all whom it may concern:*

Be it known that I, CHARLES WESLEY NICHOLSON, a citizen of the United States, residing at Assamoosick, in the county of Southampton and State of Virginia, have invented certain new and useful Improvements in Fertilizer-Distributers; and I do hereby declare the following to be a full, clear, and exact description of the invention, such as will enable others skilled in the art to which it appertains to make and use the same.

This invention relates to fertilizer-distributers, being especially designed for guano and like fertilizers which are placed on the market in the form of a powder.

The object of the invention is to secure a positive feed of the fertilizer and prevent the same banking up in the hopper.

A further object of the invention is to provide an agitator and force-feeder in one device and have the same adjustable, whereby it can be quickly adapted to different sizes of distributers within certain limits.

A still further object of the invention is to operate the agitator in an economical manner and to improve the general construction of the machine, whereby its efficiency and usefulness are increased.

The improvements consist of the novel features and the peculiar construction and combination of the parts which will be hereinafter more fully described and claimed, and which are shown in the annexed drawings, in which—

Figure 1 is a top plan view of the distributer, showing it attached to a plow. Fig. 2 is a vertical cross-section on the line $x\ x$ of Fig. 1. Fig. 3 is a perspective view, parts being broken away, of the hopper, the drive-wheel being detached, showing the agitator and force-feeder and the regulating-slide and its operating-lever. Fig. 4 is a detail view of the casting to which the agitator-head is pivotally connected. Fig. 5 is a detail view of the agitator-head detached. Fig. 6 is a detail view of the spur-pinion which is secured to the drive-wheel and which operates the agitator.

The hopper A is preferably circular in form, as shown, although this form is not essential to the spirit of the invention, and is open at the top at $a$ to receive the fertilizer. The bottom of the hopper is closed and provided with a series of discharge-openings B. The side D of the hopper is provided with an opening $d$ at its lower end opposite the discharge-openings B, the opening being preferably semicircular in form. The lower portion of the side C slants toward the opening $d$ to deflect the fertilizer through the said opening. The double-inclined cleats E, secured to the side D, extend from one side of the hopper to the other, and that portion of the bottom of the hopper below the said cleats is projected beyond the side D a distance about equal to the thickness of the cleats E. The partition F, secured to the edge of the bottom below the cleats E, projects inward from said bottom a sufficient distance to prevent the fertilizer passing through opening $d$ and over the edge of the said partition.

A supplemental chamber $f$ is formed between the side D and the partition F to receive the agitator and force-feeding devices, which comprise the casting G, head H, arms I, and the spur-pinion J. The casting G is provided with the oblong openings $g$ at each end to receive the fastening devices $g'$, which secure the same adjustably to side D and with the lug $g^2$ and the stud $g^3$. The head H is arranged between a portion of lug $g^2$ and the casting G and is pivotally connected with the casting G by pivot $g^4$, and is provided with extension $h$, which is operated on by the spur-pinion J, which is secured to the drive-wheel K. The spring $k$ is secured at one end to the head H and at its other end to the stud $g^3$ on the casting G and supplements the action of the pinion J. The arms I have their lower ends $i$ bent at right angles and are adjustably connected with the head H in any convenient manner, as by the binding-screws $i'$, which pass through slots $i^2$ in the upper ends of the arms. To give stability to the arms and relieve the screws or fastenings $i'$ of a greater part of the strain, the head H is provided with depressions $h'$ in its side, in which the upper ends of the arms I are seated. Some of the bent ends $i$ extend over the discharge-openings B only. The balance extend into the hopper to agitate the fertilizer therein, and also serve to force the fertilizer through the openings B.

The slide L, held to the hopper by the screws $l$, which pass through slots $l'$ therein, is provided with openings 12 to register with the openings B and is adjustable to regulate the size of the discharge-openings B to regulate the feed of the fertilizer, being operated by the bell-crank lever M, which is pivoted to the side D. One end of lever M engages with slide L and the other end projects through an opening $m$ in the cleat E to be grasped by the hand when adjusting the slide. The stop-plate N is adjustably secured on cleat E to limit the movement of lever M and thereby control the position of the slide L.

The distributer is bolted to a plow-beam Z, and the drive-wheel K, which is mounted on a spindle projecting from the side of the hopper, operates the agitator H I through the spur-pinion J, which acts on the extension $h$ of the head H and vibrates the said head on its pivot $g^4$.

Having thus described my invention, what I claim, and desire to secure by Letters Patent, is—

1. In a fertilizer-distributer, the combination, with the hopper having discharge-openings, and the drive-wheel provided with a spur-pinion, of the agitator pivotally connected with the hopper and adapted to be operated by the said spur-pinion, substantially as described.

2. In a fertilizer-distributer, the combination, with the hopper having discharge-openings, and the drive-wheel having a spur-pinion, of the head H, having pivotal connection with the hopper, and the arms adjustably connected with the said head, substantially as and for the purpose described.

3. In a fertilizer-distributer, the combination, with the hopper having discharge-openings, and the drive-wheel having a spur-pinion, of the head H, having pivotal connection with the hopper and having recesses in its sides, the arms I having their upper ends fitted in the said recesses in the head, and means for adjustably connecting the arms with the said head, substantially as described.

4. In a fertilizer-distributer, the combination, with the hopper having discharge-openings, and the drive-wheel having a spur-pinion, of casting G, having lug $g^2$, the head H, pivoted to the casting and lug, and the arms I, connected with the said head, substantially as described.

5. In a fertilizer-distributer, the combination, with the hopper having discharge-openings, and the drive-wheel having spur-pinion, of the head H and the arms I, connected with head H and having their ends bent, the bent ends being of different lengths, some to extend over the discharge-openings only, others to extend into the hopper to agitate the fertilizer therein, substantially as set forth.

6. In a fertilizer-distributer, the combination of the hopper having partition F and compartment $f$ between the said partition and the opposing side D of the hopper, and having opening $d$ in the said side D, and discharge-openings in the bottom opposite opening $d$, the agitator and feeding devices located in the said compartment, the cleats E, closing the top of the compartment $f$, and the drive-wheel having spur-pinion to operate the agitator, substantially as set forth.

7. In a fertilizer-distributer, the combination, with the hopper having compartment $f$ on one side, and having discharge-openings B in its bottom, and having the agitating devices located in the said compartment, and the cleats E, of the slide L, the bell-crank lever M, having one end engaged with slide L and having its other end projected through an opening in cleats E, and the stop-plate N, substantially as described, for the purpose specified.

In testimony whereof I affix my signature in presence of two witnesses.

CHARLES WESLEY NICHOLSON.

Witnesses:
E. C. BARRETT,
T. M. HOWARD.